United States Patent [19]

Hedlund

[11] Patent Number: 4,711,321
[45] Date of Patent: Dec. 8, 1987

[54] DEVICE FOR METERING LIQUID MEDIA, PARTICULARLY LUBRICANTS

[76] Inventor: Bo Hedlund, P.O. Box 5011, S-826 05 Söderhamn, Sweden

[21] Appl. No.: 882,882
[22] PCT Filed: Nov. 27, 1985
[86] PCT No.: PCT/SE85/00488
    § 371 Date: Jul. 7, 1986
    § 102(e) Date: Jul. 7, 1986
[87] PCT Pub. No.: WO86/03290
    PCT Pub. Date: Jun. 5, 1986

[30] Foreign Application Priority Data

Nov. 28, 1984 [SE] Sweden .................. 8406002

[51] Int. Cl.⁴ .................. G01F 11/04; F16N 27/00; F16K 21/16
[52] U.S. Cl. .................. 184/7.4; 184/29
[58] Field of Search .................. 417/391; 184/7.4, 29, 184/39.1, 7.4 C, 7.4 CR, 7.4 D, 7.4 E, 7.4 F

[56] References Cited

U.S. PATENT DOCUMENTS

| | | | |
|---|---|---|---|
| 1,652,764 | 12/1927 | Cowles | 184/7.4 X |
| 1,767,490 | 6/1930 | Sweet | 184/7.4 |
| 1,881,842 | 10/1932 | Moore | 184/7.4 |
| 1,897,609 | 2/1933 | Cowles | 184/7.4 |
| 2,000,925 | 5/1935 | Cowles | 184/7.4 |
| 2,532,269 | 11/1950 | Davis | 184/7.4 |
| 3,119,463 | 1/1964 | Jackson | 184/7.4 |
| 3,559,765 | 2/1971 | Smith | 184/7.4 |
| 3,985,205 | 10/1976 | Hedlund et al. | 184/7.4 |

FOREIGN PATENT DOCUMENTS

| | | |
|---|---|---|
| 0098819 | 1/1984 | European Pat. Off. . |
| 1185429 | 1/1965 | Fed. Rep. of Germany . |
| 408484 | 6/1979 | Sweden . |
| 412220 | 2/1980 | Sweden . |
| 1395351 | 5/1975 | United Kingdom . |

Primary Examiner—Leonard E. Smith
Attorney, Agent, or Firm—Larson and Taylor

[57] ABSTRACT

A liquid media metering device of the type having a plunger body acting in a chamber between an inlet and an outlet and having a conical closing part to close the outlet and a piston part at its other end. A clearance between the piston part and the chamber allows liquid to flow past the piston. A sealing ring is applied with a light force against a cylindrical surface opposing the conical part surface such that in an uninfluenced condition and by means of friction it is retained in a given position in relation to the cylindrical surface.

7 Claims, 10 Drawing Figures

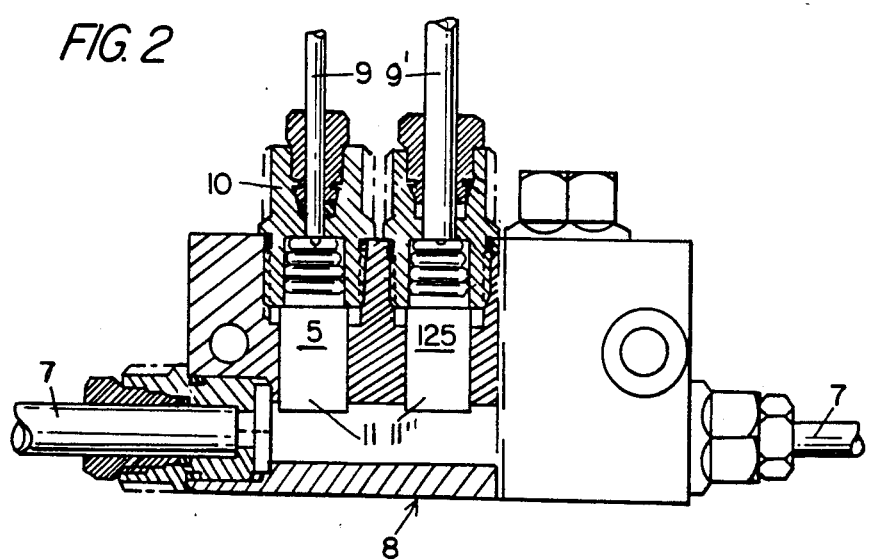
FIG. 2
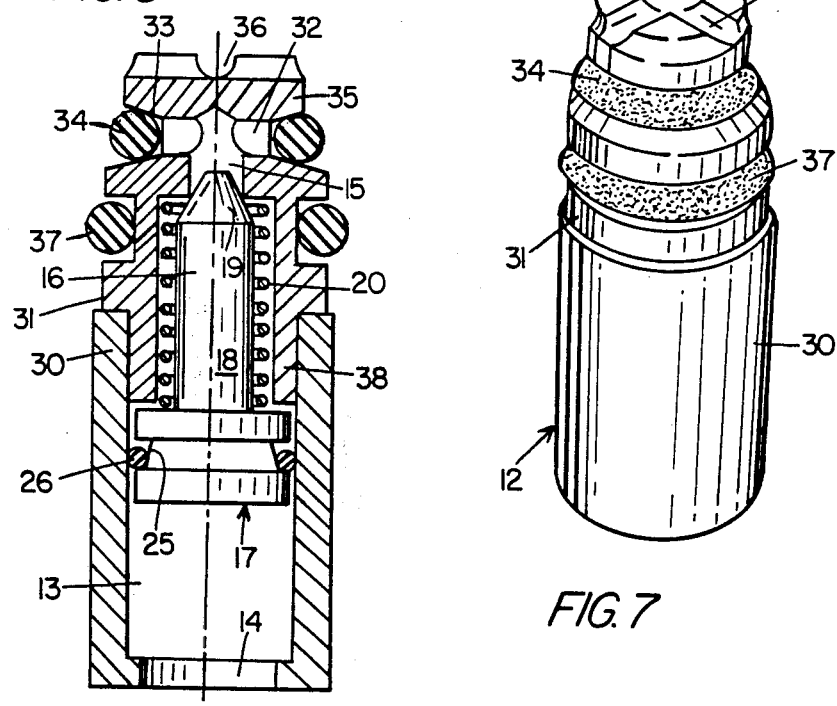
FIG. 8
FIG. 7

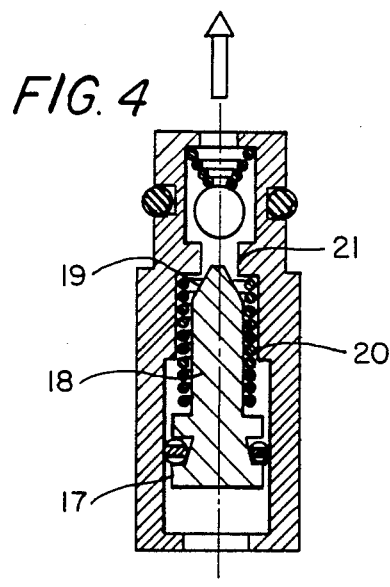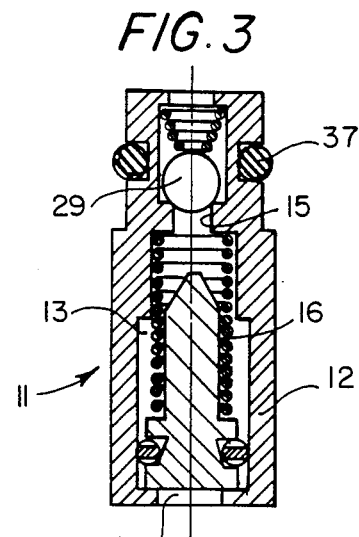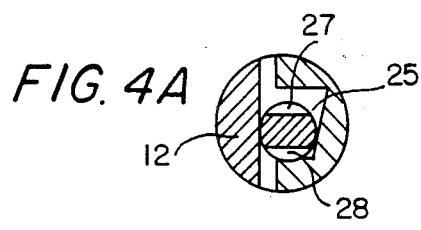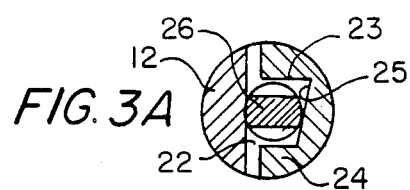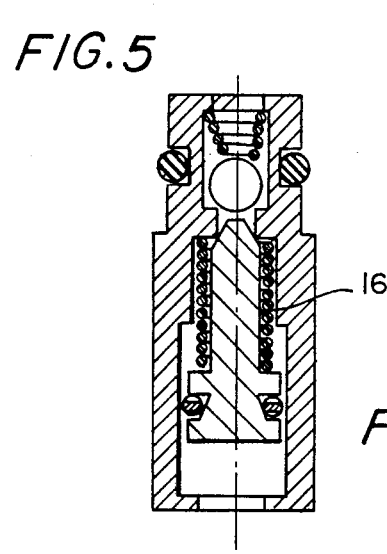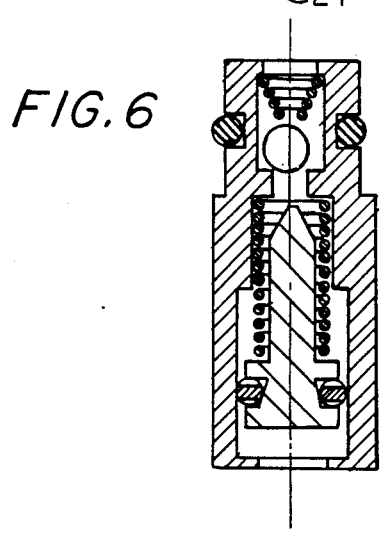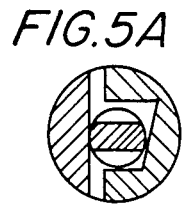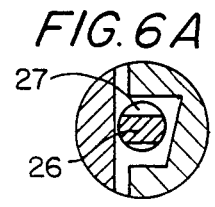

DEVICE FOR METERING LIQUID MEDIA, PARTICULARLY LUBRICANTS

This invention relates to a device for metering liquid media, particularly lubricants, comprising a plunger: body acting between an inlet and an outlet in a chamber being circular in section, said body having on the one hand a suitably conical closing part with the purpose of blocking the outlet when the plunger body is moved to a forward end position, and on the other hand having a piston or piston-shaped part with a diameter that is at least somewhat smaller than the diameter of the chamber, so that a gap is formed between the outside of the piston and the inside of a housing confining the chamber, said medium being able to pass through said gap in order to charge the space between the piston and the outlet when the plunger body, suitably by means of a spring, is being returned to a backward end or starting position, a sealing ring, placed in the area of the periphery of the piston, being arranged to cooperate with a conically narrowing surface in such a way that said sealing ring is brought closer to said conical surface when the plunger body is moved in the direction towards the outlet in order to seal or close said gap and in that way render a backflow of the medium past the piston impossible, and on the other hand being distanced from the conical surface and allowing free passage for the medium past the piston, when the plunger body is moved in the direction towards the inlet.

When in the following discussion, in connection with the invention, liquid media are discussed, this is not intended to mean only such thinly fluid liquids as oils and the like but also such media that are semi-liquid or viscous, as for instance fats or thixotropic liquids.

BACKGROUND OF THE INVENTION

For the lubrication of vehicles and/or machines of different kinds, so called single pipeline systems are often used that work with pressure sequences in an arrangement of conduits that lead from a pressure producer or feeding pump to those separate metering devices or elements, which are included in the system to a number that agrees with the number of lubrication points. The most simple metering element consists of a restriction in the form of a calibrated orifice. At a given pressure difference a metered amount is dispensed by this kind of element, which amount is a function of the area of the orifice, the viscosity of the lubricating medium and the duration of the pressure. This kind of metering element is however generally considered to be too inaccurate.

In order to obtain good accuracy it is required that the metering element meters a given volume of medium independently of variations in the pressure, of the viscosity of the medium and of the tolerances in the metering element.

Metering devices of the above described kind are disclosed in the U.S. Pat. Nos. 1,897,609 and 2,000,925. These designs do however not function satisfactorily. The metering element does not have any stable sealing function of the "sluicing cone" of the metering piston.

In the design according to U.S. Pat. No. 1,897,609, the piston element in question floats freely in its associated chamber without any hydrostatically defined position in relation to the cone in question. This means that the piston will oscillate in every intermediate position in relation to the cone. In the end positions other conditions arise and mechanical stops and hydrodynamic forces influence the function. The essential factor, from the functional point of view, is however that the metering piston is not "tight" in its path between the end positions, which results in that an indefinably larger amount of lubricant than intended being discharged.

In the design according to U.S. Pat. No. 2,000,925 an attempt has been made to remove this drawback by introducing a spring that is intended to forcibly close the cone against the piston. In this case as well, however it is impossible to make this solution stable. In order to meet the two functional conditions at the discharge and at the return, certain conditions have to be met. The requirements thus are that the cone has to be closed at the discharge and open at the return. If the spring force is chosen to correspond to the pressure difference across the piston, between inlet side and outlet side, this cone will also oscillate. In the other cases the cone will have a distinct position, open or closed.

BRIEF DESCRIPTION OF THE INVENTION

A purpose of this invention is to remove the drawbacks in the known metering devices of this kind and to create a metering device that is simple and inexpensive to manufacture and that gives good accuracy, reliability, and at the same time has small dimensions. These and other purposes are obtained according to the main characteristics of the invention by the fact that the sealing ring is at least lightly pressed or clamped against a cylindrical surface opposing the conical surface in order to, in an uninfluenced condition and by means of friction, be retained in a given position in relation to said cylindrical surface.

The invention differs from the known, previous designs in that the type of force that gives a stable sealing to the corresponding elements has been designed to change direction, when the movement changes its direction. By the fact that the sealing ring has been designed to be clamped against the inside of the cylinder in a balanced way, a force is obtained that, when the movement is made, has to be overcome with a force from the plunger body. Depending on the direction of movement the sealing ring is made to open or close against the conical surface.

BRIEF DESCRIPTION OF THE DRAWINGS

In the drawings

FIG. 2 shows a metering unit including a device according to the invention.

FIGS. 3 to 6 show sections of a device according to the invention, wherein the figures designated with "A" show an enlarged detail, the different figures showing the device in four different functional conditions.

FIGS. 7 and 8 respectively show a perspective view and a section of an alternative preferred embodiment of the device according to the invention.

DETAILED DESCRIPTION OF PREFERRED EMBODIMENTS OF THE INVENTION

Figure 1:
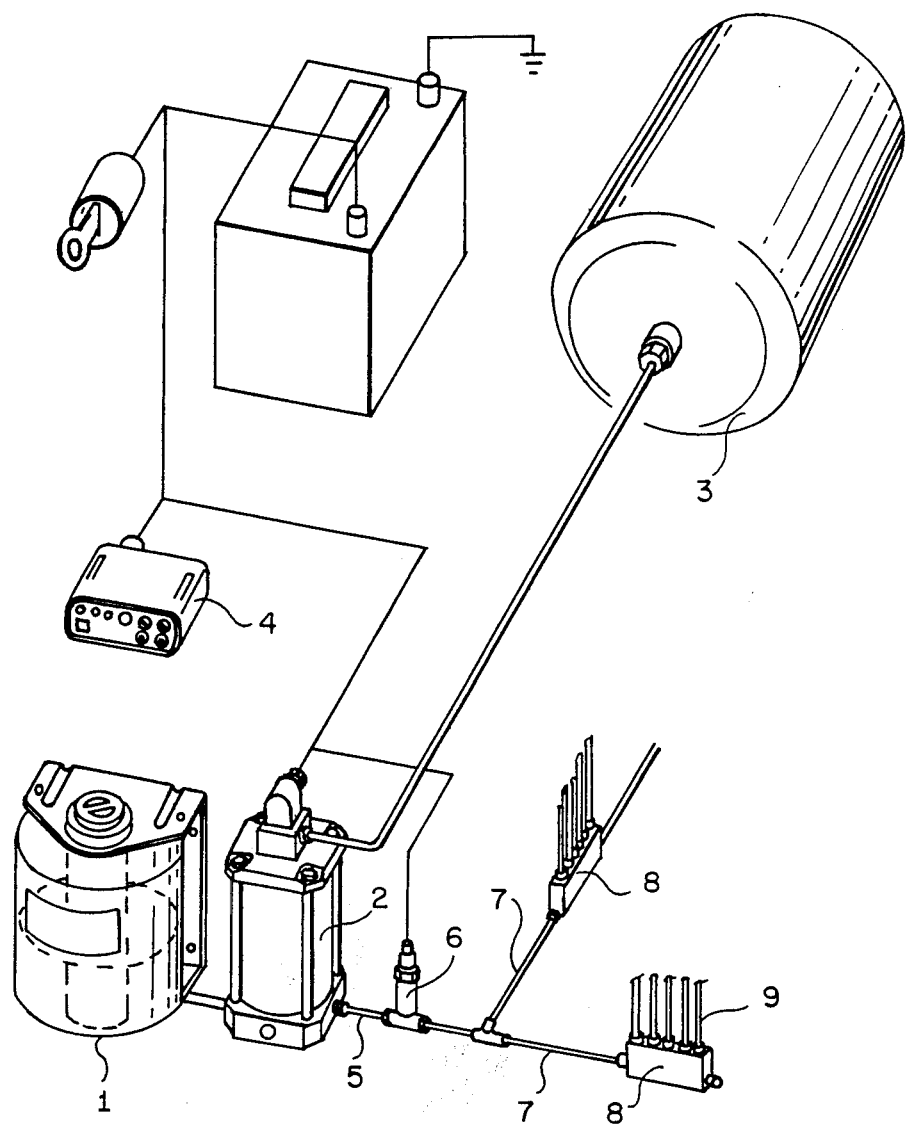
FIG. 1 shows a schematic perspective view of a per se known lubrication system of the kind to which the invention relates.

In the lubrication system, schematically illustrated in FIG. 1, a lubrication media store 1, a feeding pump 2, a pressurized air source 3 and an electronically operating control unit 4 for controlling the pump 2, all are comprised in a per se known way. A main conduit 5, coming from the pump 2 and including a pressure switch 6 connected to the control unit 4, is branched into a number of branch conduits 7 along which one or more metering units 8 are arranged, wherefrom in turn one or more lubricating conduits or tubes 9 are connected to the lubrication points in question.

Reference is now made to FIG. 2 which in an enlarged section shows a metering unit 8 to which, apart from the branch conduit 7, two lubrication tubes 9, 9' are connected. To each of these tubes in turn a cartridge-shaped metering device 11,11' in accordance with the invention is connected by means of threaded nipples 10. The characteristics of each such device or cartridge are described below with reference to FIGS. 3–6.

As can be seen in FIGS. 3–6 the cartridge 11 consists of an essentially cylindrical housing 12 wherein a chamber 13, being circular in section, is recssed. This chamber extends from an inlet 14, communicating with the conduit 7, to an outlet formed as an orifice or seat 15. A plunger body is arranged in the chamber, said body being movable backwards and forwards and provided with on the one hand a piston part 17 and on the other hand a shankformed part 19. The forward end 19 of this shank part is conical and has a diameter that enables it to penetrate into the seat 15 and to block it. The shank part constitutes a guide for a helical compression spring 20 that extends from an abutment 21 to the forward end of the piston 17.

In accordance with the principle of the invention a groove 22 is recessed into the periphery of the piston 17 (see FIG. 3 A) which is delimited on the one hand by the backward and forward side walls 22 and 23 respectively and on the other hand by a conical surface 25 forming the bottom of the groove. This conical surface converges forwards or towards the outlet 15. A circumferential ring 26 is arranged in the groove 22, the inner side as well as the outer side of said ring being part circular in section. On its forward and backward sides 27 and 28 respectively, the ring has an irregular or knobby shape. In practise this ring consists of metal and the said irregularities can be shaped by the stamping of grooves in its respective sides. The ring is advantageously open (i.e. with two opposite contacting ends), the initial diameter of the ring being at least somewhat greater than the inner diameter of the housing 12 so that the ring, when it is applied in the chamber, will be in close contact with the inside of the housing 12 with a certain pressing or spring force thereagainst.

The cartridge 11, apart from the plunger body, also includes a check valve in the form of a spring-loaded ball 29 that normally blocks the orifice 15. On the outside of the cartridge there also is an O-ring seal that forms a seal between the cartridge and the threaded nipple 10.

It should be noted that FIGS. 3–6 only are schematic insofar that they do not show how the housing of the cartridge is assembled or how the plunger body and the check valve are mounted in the housing.

THE OPERATION OF THE METERING DEVICE ACCORDING TO THE INVENTION

In the starting position shown in FIG. 3 the plunger body has been moved back in a backward end position by means of the spring 20. In this condition the space between the piston 17 and the check valve 29 is filled with a predetermined amount of lubricant to be metered. It should be noted that the piston ring 26 is in close contact with the wall of the chamber 13 with a certain, albeit small, pressing force.

When the pump 2 feeds lubricant into the pipe line system 5,7 an increase of pressure ensues therein and this increase of pressure sets the plunger body 16 into motion in the direction towards the outlet 15, against the action of the spring 20. The piston ring 26 at this stage strives to remain in its given position in relation to the housing 12. This, however, has the consequence that the ring is moved backwards in the groove 22, so that it will form a seal between the conical bottom surfaces 25 and the inside of the housing 12 as shown in FIG. 4 A. This in turn means that the lubricant cannot pass between the piston and the inside of the housing during the forward motion of the plunger body. The metered volume thus on the whole will be exactly equal to the product of the cylinder diameter and the piston stroke.

When the plunger body, after the pressure in the conduit has decreased again, returns from the position shown in FIG. 5 wherein the cone part 19 blocks the orifice 15, to the starting position shown in FIG. 3, the ring 22 will, as shown in FIGS. 6 and 6A, take a position in close vicinity to the forward sidewall 23, this last mentioned wall then bringing the ring into the starting position. Because the ring 22 has a diameter smaller than the distance between the inside of the housing 12 and the deepest part of the groove 22, and because the forward side of the ring is knobby, at 27, the lubricant can pass past the ring and into the space between the piston and the check valve in order to charge this space with new lubricant.

Reference is now made to FIGS. 7 and 8 which illustrate a further development and in practice a preferred embodiment of the metering device according to the invention. In this case, the housing, wherein the plunger body 16 is contained, has the form of a cartridge 12' composed of two interconnected cylinders 30,31, of which the first mentioned contains the piston 17 and has a greater outer diameter than the last mentioned cylinder. In the thinner cylinder a cylindrical space is recessed whose forward end is formed as a seat or outlet 15 being closable by means of the conical end 19 of the shaft part 18, said outlet leading to one or more radial channels 32. These radial channels lead to a circumferential groove 33 formed in the outside surface of the cylinder 31, an O-ring seal 34 being arranged in said groove and forming a check valve that is extremely simple and inexpensive to make. As can be seen in FIG. 8, the groove 33 is wedge-formed narrowing in the direction towards the center of the cartridge. It should also be noted that the part 35 of the cylinder 31, which is situated in front of the O-ring seal 34, has a smaller diameter than the rest of the cylinder 31. By this means the medium fed can flow past this part 35 of the cylinder when the cartridge is inserted into a nipple or holder whose diameter corresponds to the diameter of the main part of the cylinder 31. In the part 35 two crosswise oriented grooves 36 are recessed, allowing the free passage of the medium to a centrally placed feeding or lubricating tube even if this tube has small dimensions.

In this embodiment as well, a sealing O-ring 37 is applied to the outside of the cylinder or cartridge.

The backward end of the cylinder 31 is advantageously shaped as a casing 38 that can be inserted into the forward end of the cylinder 30 and can be connected thereto by means of a simple press-procedure.

It should be noted that the cylinder 30 has a markedly greater lenghth than the protruding part of the cylinder 31 which protrudes therefrom. This, in combination with the fact that the cylinder 31 has a smaller diameter than the cylinder 30, ensures that the cartridge cannot be incorrectly mounted into the holder in question.

Essential advantages of the invention are that the same type of metering device can be used for media with different viscosity at the same time as, in the lubricating system in question, the recharging times can be made shorter and with less spread. Further, the metering accuracy can be made extremely good without having to increase the demands on dimensional accuracy at the same time as the same metering accuracy in the different metering devices can be retained even if the viscosity of the lubricant is changed due to variations in temperature.

MODIFICATIONS OF THE INVENTION

The invention is of course not restricted to the embodiments as described and as shown in the drawings. Thus it is evident that the metering device can be used for other optional, liquid or semi-liquid media than lubricants. Although in practice it is preferred to shape the piston ring 26 in a knobby or irregular form on the front side as well as on the back side in order to avoid the risk of an incorrect mounting, it is possible to shape only the front side in this way since the medium freely can pass past the backside when the recharging of the cartridge takes place. It is also possible to shape the piston ring with a throughout circular section, a separate, knobby or otherwise media-permeable washer being inserted between the piston ring and the forward side wall 23. For the same purpose it is also possible to form passage-forming grooves in the sidewall. It should also be pointed out that the conical surface against which the piston ring seals, need not necessarily have the character of a bottom of a groove in the piston. Thus the side wall 23 can be replaced by a number of peripherically separated carrier elements, for instance dowels or other protrusions.

Figure 9:
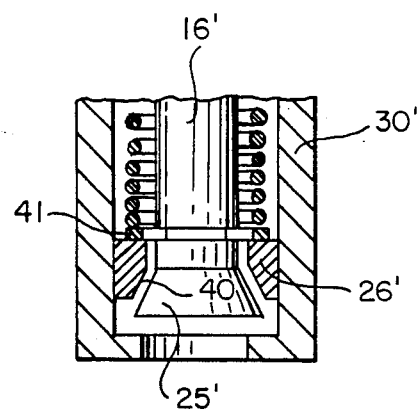

In FIG. 9 an embodiment is shown wherein the cone surface 25' cooperates with a sealing ring 26' clamped against the inside of the cylinder 30', said sealing ring having a sealing surface 40 with a conical shape corresponding to the surface 25'. In this case a locking ring 41 serves as a carrier which, apart from a circumferential ring part, also includes a number of inwardly directed gripping tabs 42 engaging a narrow groove in the outer side of the plunger body 16'. Between these gripping tabs 42 passages are formed through which the medium in question can pass when the sealing ring, at the return of the plunger body to the starting position, is released from its sealing engagement with the cone surface 25'.

Figure 10:
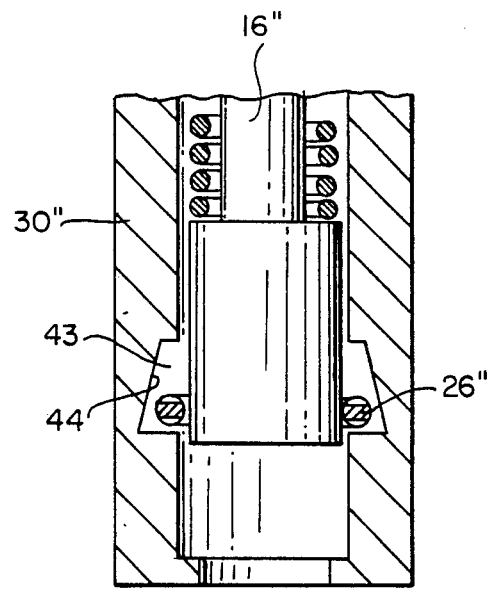
FIGS. 9 and 10 are partial sections of two further, alternative embodiments.

FIG. 10 illustrates schematically the possibility of arranging a sealing ring 26" in a groove 43 recessed in the inside of the cylinder 30". In this case the bottom 44 of the groove 43 forms a conical surface converging in the direction towards the outlet of the cylinder. The piston 17 of the plunger body 16" has a stroke that is at least somewhat greater than the stroke of the plunger body. Furthermore, the sealing ring 26" is clamped or pressed against the outside of the smooth piston 17' so that in an uninfluenced condition it always strives to remain in a given position relative to the piston. At the motion of the piston in the direction towards the outlet, the sealing ring thus is carried along so that it will form a seal between the outside of the piston and the part of the cone surface 44 having the smallest diameter. At the motion of the piston in the opposite direction, the sealing ring is carried along to the wider part of the groove 43, the medium in question then being able to freely pass the ring in order to recharge the cartridge.

I claim:

1. Device for metering liquid media, particularly lubricants, comprising a plunger body (16) acting between an inlet (14) and an outlet (15) in a chamber (13) being circular in section, said body having on one hand a suitably conical closing part (19) with the purpose to block the outlet (15) when the plunger body (16) is moved to an forward end position, and on the other hand having a piston or piston-shaped part (17,17') with a diameter that is at least somewhat smaller than the diameter of the chamber (13), so that a gap is formed between the outside of the piston and the inside of a housing (12,30,30',30") confining the chamber, said medium being able to pass through said gap in order charge the space between the piston and the outlet (15) when the plunger body (16), suitably by means of a spring (20), is being returned to a backward end or starting position, a sealing ring (26), placed in the area of the periphery of the piston (17), being arranged to cooperate with a conically narrowing surface (25,25',44) in a way that said sealing ring is brought closer to said conically narrowing surface, (25) when the plunger body (16) is moved in the direction towards the outlet (15), in order to seal or close said gap and in that way render a backflow of the medium past the piston impossible, and on the other hand being distanced from the conically narrowing surface (25) and allowing free passage for the medium past the piston when the plunger body (16) is moved in the direction towards the inlet (14), characterized in, that the sealing ring (26,26',26") is at least lightly pressed or clamped against a cylindrical surface (13,17') opposing the conically narrowing surface (25,25',44) in order to, in an uninfluenced condition and by means of friction, be retained in a given position in relation to said cylindrical surface.

2. Metering device according to claim 1, characterized in, that at least in front of the conically narrowing surface (25,25') a carrier (23,41) is arranged with the purpose to, at the return of the plunger body (16) to the starting position and in counteraction of said friction effect, forcibly carry the ring (26,26') in the direction towards the inlet.

3. Metering device according to claim 2, characterized in that, behind the conically narrowing surface (25), there is a carrier (24) with the purpose to carry the ring along, when the ring, in its backward end position, forms a seal between the piston and the inside of the housing, all in order to avoid that the ring is wedged between the conically narrowing surface (25) and the inside of the housing (12).

4. Metering device according to claim 1, characterized in that the conically narrowing surface (25) is in the shape of a bottom in a groove (22) recessed in the periphery of the piston (17), said groove having a forward as well as a backward side wall (23,24), both serving as carriers for the ring (26).

5. Metering device according to claim 4, characterized in that the ring (26), at least on its side facing the forward side wall (23) of the groove (22) has an irregular, suitably knobbly shape in order to allow the passage of medium between the ring (26) and said side wall (23)

when the first-mentioned lies against the last-mentioned.

6. Metering device according to claim 5, characterized in that opposite sides of the rings (26) have an irregular shape in order to prevent an incorrect mounting of the ring.

7. Metering device according to claim 4, characterized in that the ring is smooth and cooperates with medium-passing passages in said forward side wall.

* * * * *